(12) United States Patent
Buening et al.

(10) Patent No.: US 6,781,262 B2
(45) Date of Patent: Aug. 24, 2004

(54) GENERATOR AND AIR DEFLECTOR

(75) Inventors: Duane Joseph Buening, Anderson, IN (US); Michael L. Hull, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 25 days.

(21) Appl. No.: 10/354,635

(22) Filed: Jan. 29, 2003

(65) Prior Publication Data

US 2004/0145255 A1 Jul. 29, 2004

(51) Int. Cl.$^7$ ................................................ H02K 9/00
(52) U.S. Cl. ........................................ 310/63; 310/263
(58) Field of Search ........................... 310/263, 42, 71, 310/62, 63

(56) References Cited

U.S. PATENT DOCUMENTS

| | | | | |
|---|---|---|---|---|
| 4,565,936 A | * | 1/1986 | Ikegami et al. | 310/62 |
| 4,617,485 A | | 10/1986 | Nakamura et al. | 310/65 |
| 5,793,143 A | * | 8/1998 | Harris et al. | 310/263 |
| 5,977,668 A | * | 11/1999 | Yoshioka | 310/62 |
| 6,369,486 B1 | * | 4/2002 | Armiroli et al. | 310/263 |
| 6,563,247 B2 | | 5/2003 | Nguyen | |
| 6,580,187 B2 | | 6/2003 | Bradfield | |

* cited by examiner

Primary Examiner—Tran Nguyen
(74) Attorney, Agent, or Firm—Jimmy L. Funke

(57) ABSTRACT

An improved generator has an improved rotor assembly that includes a rotor shaft defining an axis of rotation, a first pole member and a second pole member mounted on the rotor shaft and a deflector supported about the axis of rotation and having non-magnetic axial extensions. Pole claws of the first pole member and second pole member comprise north and south poles that are intermeshed and spaced apart from one another. The deflector is supported about either of the first end or second end of the shaft and corresponds to the member mounted on the same end of the shaft. The deflector is adapted to rotate with the corresponding member and includes a plurality of non-magnetic axial extensions having a base extending between adjacent pole claws of the corresponding member. The non-magnetic axial extensions provide a substantially uniform circumference creating more desirable airflow as the improved rotor assembly rotates about its axis. The resulting airflow produces less noise as less air impinges against a surrounding stator.

5 Claims, 4 Drawing Sheets

GENERATOR AND AIR DEFLECTOR

TECHNICAL FIELD

The present invention relates to an improved generator. More specifically, the present invention provides an improved generator having an improved rotor assembly including an air deflector.

BACKGROUND OF THE INVENTION

Without a generator, the electrical load of a vehicle would quickly drain a fully charged battery. In a vehicle, a generator producing alternating current (AC), known as an alternator, is often mounted at the front of the engine and is linked to the engine crankshaft pulley by a drive belt. When the engine turns the drive belt, the drive belt turns a shaft in the alternator, and current is generated. Current is produced in an alternator when a wire intercepts a magnetic field. In an alternator, it is the wire, in coiled form, that is held stationary and the magnetic field is turned so that the magnetic field passes through the wire. Thus, alternators include a stationary part, the stator, and a rotating part, the rotor.

The stator may include stationary coils or slotted pins or members that surround a rotor. As the rotor is turned by the car engine, the alternating magnetic field created by the rotor is intercepted by the stationary coils, pins or members, and current flows through the stator first in one direction, then in the other, resulting in alternating current. As the rotor is turned, air flow within the assembly will produce noise in the audible range that will emanate from the alternator assembly.

The rotor includes an electromagnet that is magnetized by current from the battery. The electromagnet may include slip rings, rotor windings, and north and south pole members surrounding the rotor windings. Current from the battery flows through the slip rings to the rotor windings. North and south pole members have pole claws shaped like interlocking teeth surrounding the rotor windings. The north and south pole members create an alternating magnetic field as the rotor turns.

A housing surrounds the rotor and stator assembly. The stator is fixed relative to the housing and the rotor shaft is rotatably mounted relative to the housing. Because the battery and electrical components in the car work on direct current (DC), the AC output of the alternator must be converted to DC. This is done with rectifiers which pass current in one direction only. Because, the components within the alternator produce heat and because the alternator operates under high under hood temperatures, a fan is included in the alternator assembly. The fan may be placed inside or outside of the housing to increase airflow between the rotor and stator and to increase airflow through openings in the housing. The fan blades may face inward toward the central portion of the alternator or outward away from the central portion of the alternator. Rotation of the fan increases airflow within the alternator and helps to reduce heat.

U.S. Pat. No. 4,617,485, assigned to Nippondenso Co., Ltd., describes one attempt to reduce windage noise produced as a result of airflow interference between the rotor and the stator utilizing spacers centrally mounted between adjacent pole core claws. The spacers are comprised of either discrete wedges mounted with an interference fit or are integrally formed into a ring. As described, the spacers are mounted centrally between opposing pole core claws. It appears that the spacers of this invention must be mounted relative to the claws either individually as separate wedges or as a ring. It appears that the direct fit between the spacers and claws will vary with manufacturing tolerances and temperature.

The inventors of the present invention have recognized a need for an improved method of reducing noise emanating from the generator. Unlike known methods, Applicants have invented a deflector that does not require separate installation of individual wedges or a free floating ring. Further, the fit of the present invention will be more independent from temperature variations. The present invention also directs airflow in a manner different from known methods. Additional advantages of the present invention are described and will become apparent with reference to the drawings and specification provided herein.

SUMMARY OF INVENTION

An exemplary embodiment of the present invention includes a rotor and a deflector for use in an improved generator. The rotor includes a rotor shaft extending in an axial direction and defining an axis of rotation, a first pole member mounted on a first end of the shaft and having a first set of teeth, and a second pole member mounted on a second end of the shaft and having a second set of teeth. The first and second pole members are opposing one another and comprise north and south pole members. The first set of pole claws and second set of pole claws are intermeshed and spaced apart from one another. The deflector is supported about either of the first end or second end of the shaft and corresponds to the adjacent pole member mounted on the same end of the shaft. The deflector is adapted to rotate with the corresponding pole member and includes a plurality of non-magnetic axial extensions having a base portion extending between adjacent pole claws of the corresponding member and terminating proximal an intermeshed pole claw of the opposing pole member. The axial extensions provide a more uniform circumference creating more desirable airflow as the rotor rotates about its axis. The resulting airflow results in less noise as less air impinges against a surrounding stator. The deflector axial extensions may further include a first side extension and a second side extension each further extending from the base portion and surrounding the intermeshed pole claw of the opposing pole member. The deflector disc may further include at least one aperture for improving axial airflow within the pole members.

Additional aspects of the present invention will become apparent with reference to the following Figures, detailed description and claims.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
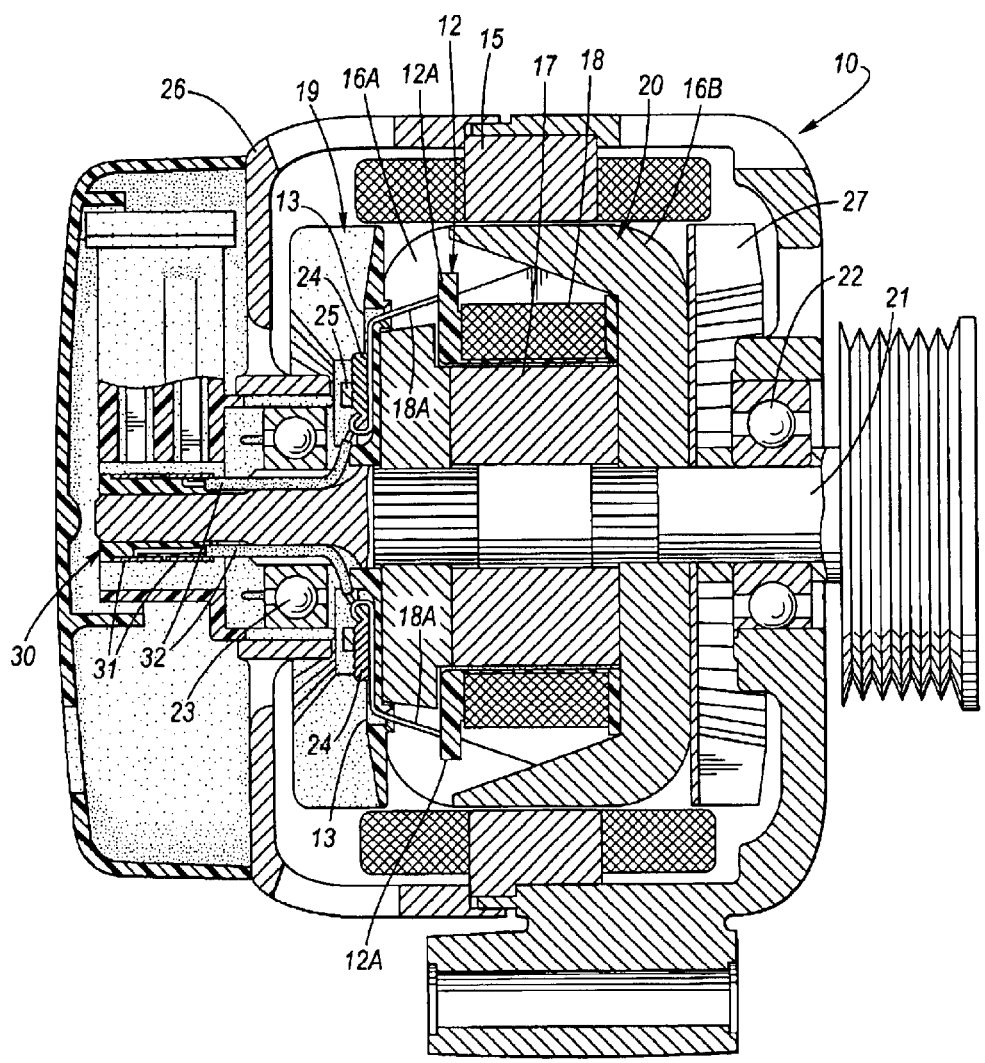
FIG. 1 provides a sectional view of an exemplary generator.

The present invention provides an improved generator utilizing an improved rotor assembly. FIG. 1 illustrates an exemplary generator 10 in which the improved rotor assembly of the present invention may be used. The exemplary generator includes a stator assembly 15 surrounding a rotor assembly 20. The rotor assembly 20 includes a shaft 21 supporting all rotating magnetic structures including conventional pole-members 16A and 16B, a rotor core 17 and a field coil 18 wound upon bobbin 12. Additionally, all other non-magnetic circuit rotating structures are carried, including air circulation fans 19 and 27 located at axially opposite sides of the pole-members, and a slip ring assembly 30 located at one extreme end of the shaft 21. The fan 27 is formed from sheet metal stock and spot welded to the pole-member 16B while fan 19 is formed from an appropriate thermoplastic material and heat staked to tower extensions (not shown) from the field coil bobbin 12. The shaft 21 is rotatably supported within a housing 26 by a pair of bearings 23 and 22. Bearing 23 is located between the slip ring assembly 30 and the fan 19. Coil leads 18A of field coil 18 are wrapped about respective posts 12A of bobbin 12 and pass through holes 13 in fan 19. Slip ring assembly 30 is made of a pair of copper rings 31 each having a slip ring lead 32 joined such as by welding thereto. The copper rings and wires are molded into a thermoset material to complete the slip ring assembly 30. Slip ring assembly 30 is pressed onto the end of rotor shaft 21 and the slip ring leads 32 are routed into channels along the shaft 21 where they are joined, such as by twisting and welding, to the coil leads 18A of field coil 18 via a joint 24. The joint 24 is then bent to the surface of the fan 19 and received in a pyramid shaped tab structure 25. The joint 24 is then secured to fan 19 by ultrasonic welding of the plastic material of the tab 25. Bearing 23 is assembled to pass over the slip ring assembly 30 to retain the lead wires 32 securely within the shaft channels. Preferably, the improved generator of the present invention includes an improved rotor assembly including the inventive air deflector described with respect to FIGS. 2–5. Various embodiments of the present invention are described herein.

Figure 2:
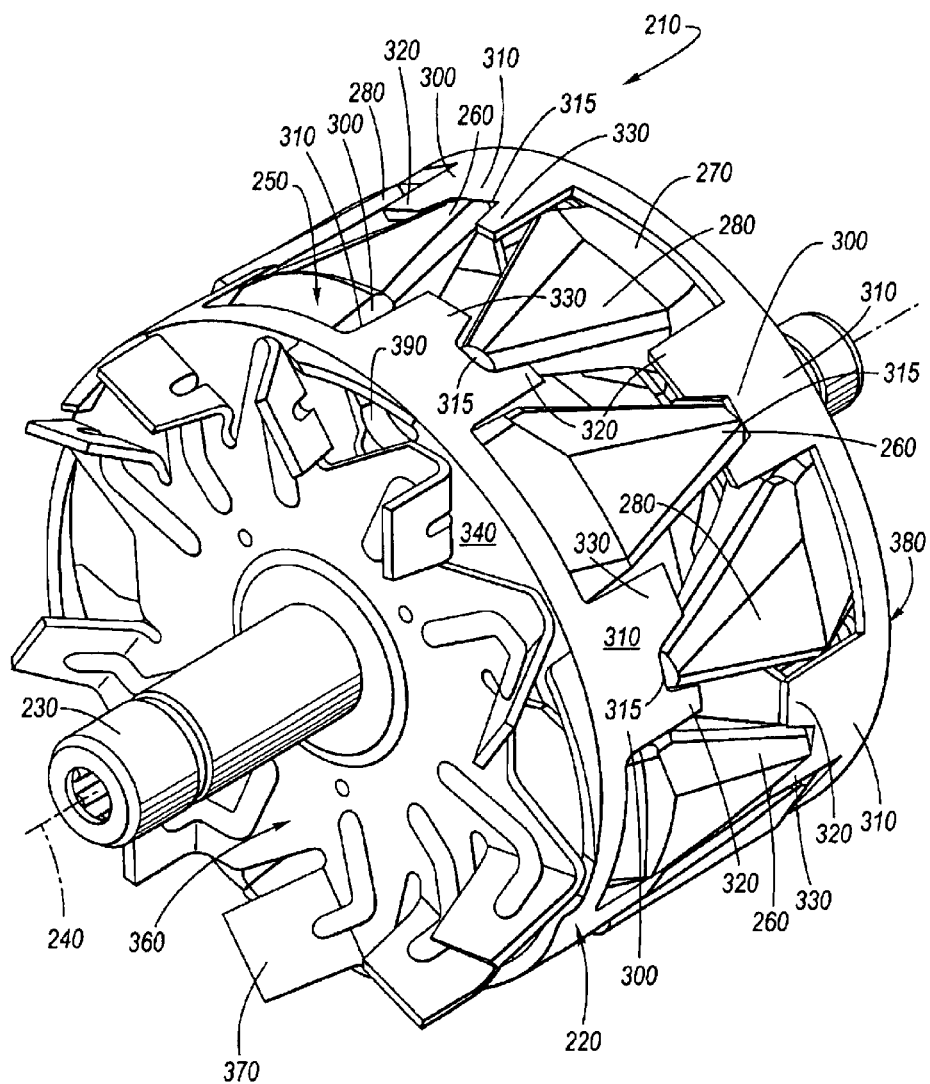
FIG. 2 provides an isometric view of a rotor and deflector according to an embodiment of the present invention.

FIG. 2 provides an isometric view of an improved rotor assembly 210 for use in an improved generator. The improved rotor assembly 210 includes a deflector 220 mounted on a rotor shaft 230 extending in an axial direction and defining an axis of rotation 240, a first pole member 250 mounted on a first end of the rotor shaft 230 and having a first set of pole claws 260, and a second pole member 270 mounted on a second end of the rotor shaft 230 and having a second set of pole claws 280. The first pole member 250 and second pole member 270 are opposing one another and comprise north and south pole members. The first set of pole claws 260 and second set of pole claws 280 are intermeshed and spaced apart from one another. The deflector 220 may be supported about either of the first end or second end of the rotor shaft 230 and corresponds to the adjacent pole member mounted on the same end of the rotor shaft 230. The deflector 220 of the present embodiment is mounted about the first end of the rotor shaft 230. The deflector 220 is adapted to rotate with the corresponding pole member 250.

The deflector 220 includes a disc 340 suitable for mounting on a rotor shaft 230 and at least one axial extension 300 coupled to form a unitary component. The disc 340 includes at least one disc aperture 390 for improving axial airflow through the generator. The axial extensions 300 each have a base 310 extending between adjacent pole claws 260 of the corresponding member 250. A central portion 315 of the base 310 terminates proximal the end of an intermeshed pole claw 280 of an opposing pole member 270. The axial extension 300 may further include a first side extension 320 and a second side extension 330 each further extending from the base 310 and surrounding the intermeshed pole claw 280 of the opposing pole member 270. The deflector 220 provides a substantially uniform circumference creating more desirable airflow as the improved rotor assembly 210 rotates about its axis 240. In addition, the deflector 220 increases axial rotor airflow and reduces noise sensitivity to stator winding patterns. The resulting airflow results in less noise as less air impinges against a surrounding stator.

According to the present embodiment, the deflector 220 is mounted axially outward of the corresponding pole member 250 and a fan 360 is mounted outward of the deflector 220 placing the deflector 220 between the corresponding pole member 250 and fan 360. The fan blade 370 may be oriented adjacent a disc aperture 390. Although a deflector 220 is shown mounted outward of a corresponding pole member 250, the deflector 220 may be adapted to be mounted axially inward of the corresponding pole member 250, placing the corresponding pole member 250 between the deflector 220 and the fan 360. Although a fan 360 having a fan blade 370 extending in the outward direction is provided, the fan blade 370 may instead extend in the inward direction. Additionally, according to one embodiment, at least one inboard fan blade 370 may extend inward and at least one outboard fan blade 370 may extend outward of the disc 340. The fan 360 of the present embodiment may take the place of fan 27 of the exemplary generator of FIG. 1. The fan 360 and deflector 220 may be formed from a variety of materials including without limitation metal or plastic material and coupled to form a unitary component. According to one embodiment, the fan 360 and the deflector 220 may be formed from a single mold.

Figure 4:
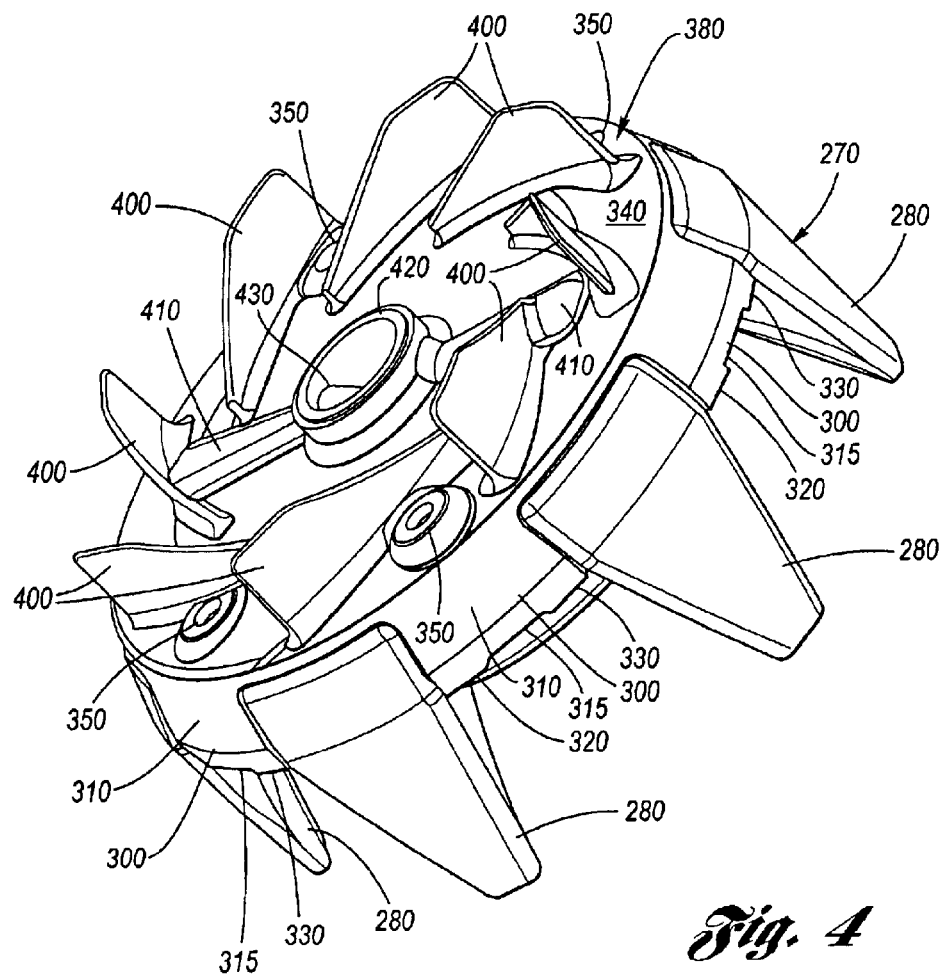
FIG. 4 provides an isometric view of a deflector and corresponding pole member according to an embodiment of the present invention.

The generator may further include an opposing deflector 380 supported about the opposite end of the rotor shaft 230 adjacent the opposing pole member 270 providing an improved rotor including deflector 220 and opposing deflector 380 as embodied and described with respect to FIG. 4.

Figure 3:
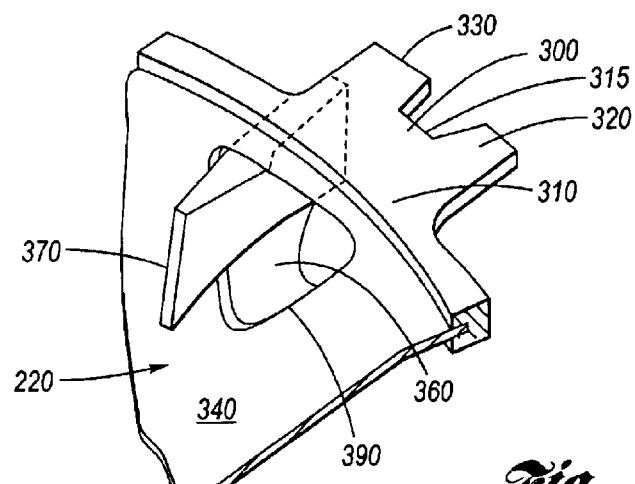
FIG. 3 provides an isometric view of a deflector and fan according to an embodiment of the present invention.

FIG. 3 provides a partial view of an embodiment of a deflector 220 for use in an improved rotor assembly 210 according to the present invention. The deflector 220 of this embodiment includes a disc 340 suitable for mounting on a rotor shaft 230 and at least one axial extension 300 coupled to form a unitary component. The disc 340 includes at least one disc aperture 390 for improving axial airflow through the generator. In this embodiment, the disc aperture 390 is additionally adapted to receive a fan blade 370 that extends through the disc aperture 390.

The axial extensions 300 each have a base 310 extending between adjacent pole claws 260 of the corresponding pole member 250, a central portion 315 of the base 310 terminates proximal the end of an opposing pole claw 280 of an opposing pole member 270. The axial extension 300 may further include a first side extension 320 and a second side extension 330 extending from the base 310 on each side of the central portion 315. The first side extension 320 and second side extension 330 are positioned between a pole claw 260 of the corresponding pole member 250. The deflector 220 provides a substantially uniform circumference creating more desirable airflow as the improved rotor assembly 210 rotates about its axis 240. In addition, the deflector 220 increases axial rotor airflow and reduces noise sensitivity to stator winding patterns.

In the present embodiment, the fan 360 is suitable for positioning axially outward of the corresponding pole member 250 and the deflector 220 is mounted axially outward of the fan 360, placing the fan 360 between the corresponding pole member 250 and the deflector 220. In one embodiment, the fan 360 may be adapted to be mounted axially outward of the deflector 220 with the blade 370 of the fan 360 extending axially inward through the disc aperture 390.

FIG. 4 provides an isometric view of an embodiment of a deflector 380 and corresponding pole member 270 for use in an improved rotor assembly 210 according to the present invention. The deflector 380 of this embodiment includes a disc 340 suitable for mounting on a rotor shaft and at least one non-magnetic axial extension 300 extending from the disc 340 to form a single unit. The deflector 380 of this embodiment further includes at least one disc blade 400 extending from the disc 340. The deflector 380 may additionally include a disc aperture 390 such as disc aperture 390 shown with respect to FIG. 2 to improve axial air flow through the generator.

The axial extensions 300 each have a base 310 extending between adjacent pole claws 280 of the corresponding member 270. A central portion 315 of the base 310 terminates proximal the end of an opposing pole claw of an opposing pole member 250. The axial extension 300 may further include a first side extension 320 and a second side extension 330 extending from the base 310 on each side of the central portion 315. The first side extension 320 and second side extension 330 are of suitable dimension to fit between a pole claw 280 of the corresponding pole member 270 and the opposing pole claws 260 of the opposing pole member 250. The deflector 380 is mounted utilizing mounting holes 350. A post extending from field coil bobbin 12 in FIG. 1 extends through mounting holes 350 and is welded to the deflector 380. The deflector 380 provides a substantially uniform circumference creating more desirable airflow as the improved rotor assembly rotates about its axis. In addition, the deflector 380 increases axial rotor airflow and reduces noise sensitivity to stator winding patterns. The resulting airflow results in less noise as less air impinges against a surrounding stator.

In the present embodiment, the disc 340 is mounted axially outward of the corresponding pole member 270 and the disc blades 400 extend axially outward from the disc 340. Although a deflector 380 mounted outward of a corresponding pole member is shown, the deflector 380 may be adapted to be mounted axially inward of the corresponding pole member 270. Because the disc blades 400 are included on the disc 340 of the deflector 380, the deflector 380 of the present embodiment can be substituted in place of fan 19 of the exemplary generator of FIG. 1. The deflector 380 can be formed from a variety of materials including without limitation plastic or metal.

Although a deflector 380 having a disc blade 400 extending axially outward from the disc 340 is provided, the disc blade 400 may instead extend axially inward from the disc 340. Additionally, according to one embodiment, at least one inboard disc blade 400 may extend inward and at least one outboard disc blade 400 may extend outward of the disc 340.

The deflector may additionally include a cylindrical mounting extension 420 and a relief feature 410 for routing a lead wire within a channel formed by the relief feature 410. The relief feature intersects the mounting extension 420 to create a passage 430 for the lead wire. According to one embodiment, the relief feature 410 is enlarged to accommodate a coiled lead wire. An exemplary relief feature 410 is shown with respect to FIG. 4.

Figure 5:
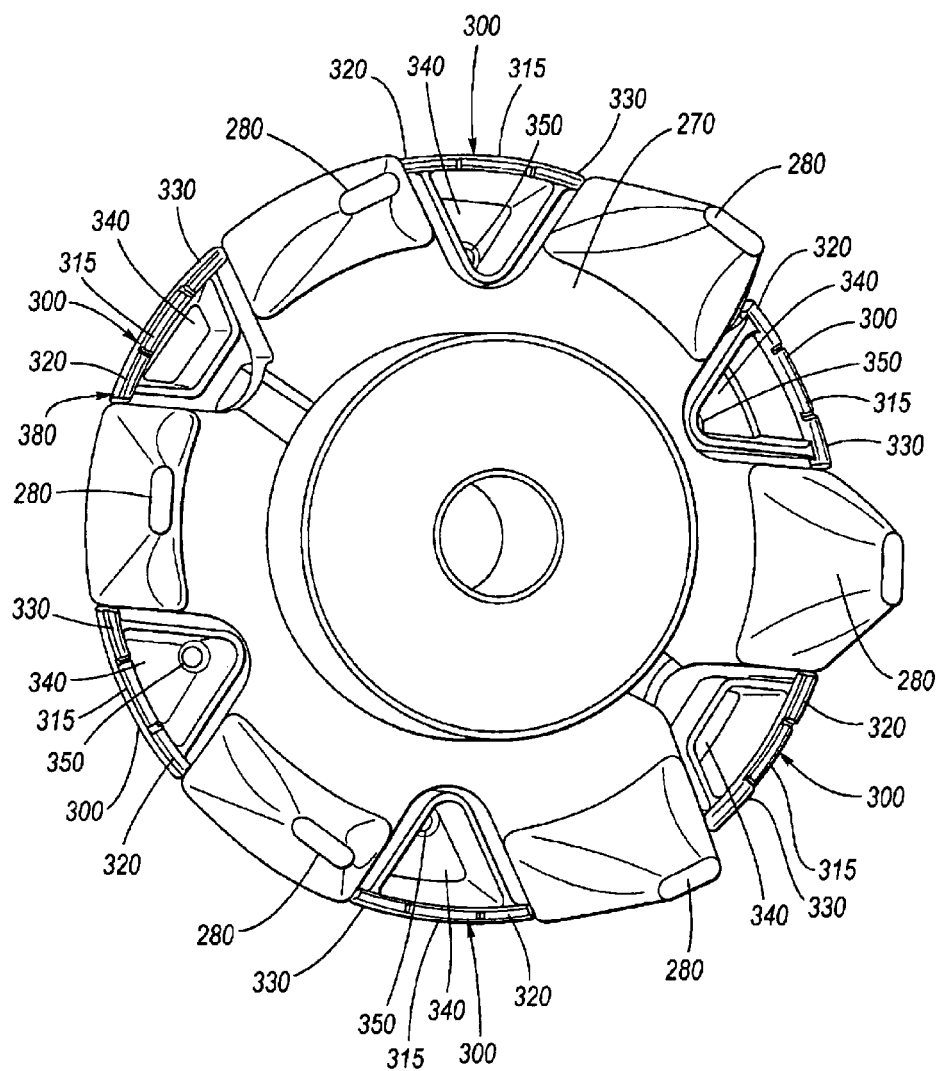
FIG. 5 provides a rear inside view of a pole member and corresponding deflector according to an embodiment of the present invention.

FIG. 5 provides a rear inside view of FIG. 4 showing the inside of the pole member 270 and the deflector 380 positioned behind the pole member 270, outboard of the pole member 270. The axial extensions 300 each have a base 310 extending between adjacent pole claws 280 of the corresponding member 270, a central portion 315 of the base 310 is sized to terminate proximal the end of an opposing pole claw of an opposing pole member.

The axial extension 300 may further include a first side extension 320 and a second side extension 330 extending from the base 310 on each side of the central portion 315. The first side extension 320 and second side extension 330 are of suitable dimension to fit between a pole claw 280 of the corresponding pole member 270 and the opposing pole claws 260 of opposing pole member 250. The deflector 380 is mounted utilizing mounting holes 350. A post extending from field coil bobbin 12 in FIG. 1 extends through mounting holes 350 and is coupled to the deflector 380. According to one embodiment, the deflector 380 is formed of a thermoplastic material and is ultrasonically welded to the post.

The deflector 380 of this embodiment provides a substantially uniform circumference creating more desirable airflow as the improved rotor assembly rotates about its axis. In addition, the deflector 380 increases axial rotor airflow and reduces noise sensitivity to stator winding patterns. The resulting airflow results in less noise as less air impinges against a surrounding stator.

While the present invention has been described with reference to an exemplary component, a variety of components may be produced utilizing the apparatus and process described herein. Modifications and variations in the invention will be apparent to those skilled in the art in light of the foregoing description. It is therefore contemplated that the appended claims and their equivalents will embrace any such alternatives, modifications and variations as falling within the scope of the present invention.

What is claimed is:

1. A generator, comprising:
   a rotor shaft extending in an axial direction and defining an axis of rotation;
   a first pole member and second pole member each mounted to the rotor shaft and opposing one another, the first pole member having a first set of pole claws and the second pole member having a second set of pole claws, the first set of pole claws and second set of pole claws extending axially inward and intermeshed with and spaced apart from one another; and
   a deflector corresponding to either of the first or second pole member, the deflector including:
      a disc supported about the rotor shaft adjacent the corresponding pole member and affixed to rotate with the corresponding pole member the disc of the deflector further including a relief feature and cylindrical mounting extension that intersect to create a lead wire passage, and
      a plurality of non-magnetic axial extensions extending from the disc, the non-magnetic axial extensions including a base extending between adjacent pole claws of the corresponding pole member and a central portion terminating adjacent an intermeshed pole claw of the opposing pole member.

2. A generator, comprising:
   a rotor shaft extending in an axial direction and defining an axis of rotation;
   a first pole member and second pole member each mounted to the rotor shaft and opposing one another, the first pole member having a first set of pole claws and the second pole member having a second set of pole claws, the first set of pole claws and second set of pole claws extending axially inward and intermeshed with and spaced apart from one another;

a deflector corresponding to either of the first or second pole member, the deflector including:

a disc supported about the rotor shaft adjacent the corresponding pole member and affixed to rotate with the corresponding pole member;

a plurality of non-magnetic axial extensions extending from the disc, the non-magnetic axial extensions including a base extending between adjacent pole claws of the corresponding pole member and a central portion terminating adjacent an intermeshed pole claw of the opposing pole member; and at least one fan blade extending from the disc portion including at least one inboard fan blade extending axially inward of the disc portion and at least one outboard fan blade extending axially outward of the disc portion.

3. A generator, comprising:

a rotor shaft extending in an axial direction and defining an axis of rotation;

a first role member and second pole member each mounted to the rotor shaft and opposing one another, the first pole member having a first set of pole claws and the second pole member having a second set of pole claws, the first set of pole claws and second set of pole claws extending axially inward and intermeshed with and spaced apart from one another;

a deflector corresponding to either of the first or second pole member, the deflector including:

a disc supported about the rotor shaft adjacent the corresponding pole member and affixed to rotate with the corresponding pole member, the disc further including at least one disc aperture; and a plurality of non-magnetic axial extensions extending from the disc, the non-magnetic axial extensions including a base extending between adjacent pole claws of the corresponding pole member and a central portion terminating adjacent an intermeshed pole claw of the opposing pole member; and a fan mounted adjacent the deflector, the fan having fan blades extending through the disc apertures of the disc.

4. A deflector for use in a generator having a rotor shaft supporting opposing pole members with intermeshed and spaced apart pole claws extending axially inward, comprising:

a disc supported on the generator rotor shaft adjacent one of the opposing pole members, the disc further including at least one relief feature and cylindrical mounting extension that intersect to create a lead wire passage; and a plurality of non-magnetic axial extensions extending from the disc, the non-magnetic axial extensions including a base extending between adjacent pole claws of the adjacent pole member and a central portion terminating adjacent an intermeshed pole claw of the opposing pole member.

5. A deflector for use in a generator having a rotor shaft supporting opposing pole members with intermeshed and spaced apart pole claws extending axially inward, comprising:

a disc supported on the generator rotor shaft adjacent one of the opposing pole members;

a plurality of non-magnetic axial extensions extending from the disc, the non-magnetic axial extensions including a base extending between adjacent pole claws of the adjacent pole member and a central portion terminating adjacent an intermeshed pole claw of the opposing pole member; and at least one fan blade extending from the disc portion wherein at least one inboard fan blade extends axially inward of the disc portion and at least one outboard fan blade extends axially outward of the disc portion.

* * * * *